United States Patent
Zhang et al.

(10) Patent No.: US 11,915,138 B2
(45) Date of Patent: Feb. 27, 2024

(54) METHOD AND DEVICE FOR REDUCING A SIZE OF A NEURAL NETWORK MODEL

(71) Applicant: ALIBABA GROUP HOLDING LIMITED, Grand Cayman (KY)

(72) Inventors: Weifeng Zhang, San Mateo, CA (US); Guoyang Chen, San Mateo, CA (US); Yu Pu, San Mateo, CA (US); Yongzhi Zhang, San Mateo, CA (US); Yuan Xie, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 855 days.

(21) Appl. No.: 16/793,993

(22) Filed: Feb. 18, 2020

(65) Prior Publication Data
US 2021/0256380 A1 Aug. 19, 2021

(51) Int. Cl.
*G06N 3/082* (2023.01)
*G06N 3/10* (2006.01)

(52) U.S. Cl.
CPC ............... *G06N 3/082* (2013.01); *G06N 3/10* (2013.01)

(58) Field of Classification Search
CPC .................................. G06N 3/082; G06N 3/10
See application file for complete search history.

(56) References Cited

U.S. PATENT DOCUMENTS

2018/0373978 A1* 12/2018 Yu ............................. G06N 3/10

OTHER PUBLICATIONS

Waterman, Andrew et al. "The RISC-V Instruction Set Manual vol. I User-Level ISA; Version 2.2"; RISCV [Published 2017] [ Retrieved Nov. 2022] <URL: https://riscv.org/wp-content/uploads/2017/05/riscv-spec-v2.2.pdf> (Year: 2017).*

B. -C. Lai, J. -W. Pan and C. -Y. Lin, "Enhancing Utilization of SIMD-Like Accelerator for Sparse Convolutional Neural Networks," in IEEE Transactions on Very Large Scale Integration (VLSI) Systems, vol. 27, No. 5, pp. 1218-1222, May 2019, doi: 10.1109/TVLSI.2019.2897052. (Year: 2019).*

Louis, Marcia Sahaya et al. "Towards Deep Learning using TensorFlow Lite on RISC-V"; Carry'19 [Published 2019] [Retrieved Nov. 2022] <URL: https://carrv.github.io/2019/papers/carrv2019_paper_7.pdf> (Year: 2019).*

(Continued)

*Primary Examiner* — Ann J Lo
*Assistant Examiner* — Fen Christopher Tamulonis
(74) *Attorney, Agent, or Firm* — Finnegan, Henderson, Farabow, Garrett & Dunner, LLP

(57) ABSTRACT

Methods and apparatus for reducing a size of a neural network model, the method including: compressing data of the neural network model; identifying structure information of a vector register, wherein the structure information includes a number of registers included in the vector register; comparing a number of elements in the compressed data with a first condition, wherein the first condition is determined based on the number of registers in the vector register; and in response to the number of elements satisfying the first condition, associating the compressed data with the vector register to enable loading the compressed data to the vector register.

14 Claims, 8 Drawing Sheets

(56) References Cited

OTHER PUBLICATIONS

Lou, W., Wang, C., Gong, L., Zhou, X. (2019). RV-CNN: Flexible and Efficient Instruction Set for CNNs Based on RISC-V Processors. APPT 2019. Lecture Notes in Computer Science(), vol. 11719. Springer, Cham. https://doi.org/10.1007/978-3-030-29611-7_1 (Year: 2019).*

Adam Page, Ali Jafari, Colin Shea, and Tinoosh Mohsenin. 2017. SPARCNet: A Hardware Accelerator for Efficient Deployment of Sparse Convolutional Networks. J. Emerg. Technol. Comput. Syst. 13, 3, Article 31 (Jul. 2017), 32 pages. https://doi.org/10.1145/3005448 (Year: 2017).*

Maohua Zhu, Tao Zhang, Zhenyu Gu, and Yuan Xie. 2019. Sparse Tensor Core: Algorithm and Hardware Co-Design for Vector-wise Sparse Neural Networks on Modern GPUs. (MICRO '52). Association for Computing Machinery, New York, NY, USA, 359-371. https://doi.org/10.1145/3352460.3358269 (Year: 2019).*

S. Sen, S. Jain, S. Venkataramani and A. Raghunathan, "SparCE: Sparsity Aware General-Purpose Core Extensions to Accelerate Deep Neural Networks," in IEEE Transactions on Computers, vol. 68, No. 6, pp. 912-925, Jun. 1, 2019, doi: 10.1109/TC.2018.2879434. (Year: 2019).*

Yunji Chen, Huiying Lan, Zidong Du, Shaoli Liu, Jinhua Tao, Dong Han, Tao Luo, Qi Guo, Ling Li, Yuan Xie, and Tianshi Chen. 2019. An Instruction Set Architecture for Machine Learning. ACM Trans. Comput. Syst. 36, 3, Article 9 (Aug. 2018), 35 pages. https://doi.org/10.1145/3331469 (Year: 2019).*

Dai, Xiaoliang et al., "NeST: A Neural Network Synthesis Tool Based on a Grow-and-Prune Paradigm," arXiv:1711.02017v2 [cs.NE] Nov. 20, 2017 (15 pgs.).

Dai, Xiaoliang et al., "Grow and Prune Compact, Fast, and Accurate LSTMs," arXiv:1805.11797v2 [cs.LG] May 31, 2018 (11 pgs.).

Han, Song et al., "Learning both Weights and Connections for Efficient Neural Networks," In *Proc. Advances in Neural Information Processing Systems*. 1135-1143, 2015 (9 pgs.).

Han, Song et al., "ESE: Efficient Speech Recognition Engine with Sparse LSTM on FPGA," In *Proc. ACM/SIGDA Int. Symp.*, arXiv:1612.006942v2 [cs.CL] Feb. 20, 2017 (10 pgs.).

Hill, Parker et al., DeftNN: Addressing Bottlenecks for DNN Execution on GPUs via Synapse Vector Elimination and Near-compute Data Fission, In *Proc. IEEE/ACM Int. Symp. Microarchitecture*, 786-799, 2017 (14 pgs.).

Narang, Sharan et al., "Block-Sparse Recurrent Neural Networks," arXiv:1711.02782v1 [cs.LG] Nov. 8, 2017 (12 pgs.).

Yang, Tien-Ju et al., "Designing Energy-Efficient Convolutional Neural Networks using Energy-Aware Pruning," Computer Vision Foundation, IEEE, arXiv preprint arXiv:1611.05128, 2016 (9 pgs.).

Yin, Hongxu et al., "Hardware-Guided Symbiotic Training for Compact, Accurate, yet Execution-Efficient LSTM," arXiv:1901.10997v1 [cs.NE] Jan. 30, 2019 (10 pgs.).

Yu, Jiecao et al., "Scalpel: Customizing DNN Pruning to the Underlying Hardware Parallelism," *ACM SIGARCH Computer Architecture News* 45(2):548-560, Jun. 24-28, 2017, Toronto, ON, Canada (13 pgs.).

Zhao, Wayne et al., "A General SIMD-based Approach to Accelerating Compression Algorithms," arXiv 1502.01916 (28 pgs.).

* cited by examiner

400

$$\begin{bmatrix} W_{11} & W_{12} & \ldots & W_{1n} \\ W_{21} & W_{22} & \ldots & W_{2n} \\ \vdots & \vdots & \ddots & \vdots \\ W_{m1} & W_{m2} & \ldots & W_{mn} \end{bmatrix}$$

FIG. 4

METHOD AND DEVICE FOR REDUCING A SIZE OF A NEURAL NETWORK MODEL

BACKGROUND

Artificial neural networks (ANN) are computing systems inspired by biological neural networks. Such systems learn to perform tasks by considering examples, generally without being programmed with task-specific rules. ANNs have been used on a variety of tasks, including computer vision, speech recognition, machine translation, social network filtering, playing board and video games, and medical diagnosis.

SUMMARY

Embodiments of the present disclosure provide methods and apparatus for reducing a size of a neural network model. The method includes: compressing data of the neural network model; identifying structure information of a vector register, wherein the structure information includes a number of registers included in the vector register; comparing a number of elements in the compressed data with a first condition, wherein the first condition is determined based on the number of registers in the vector register; and in response to the number of elements satisfying the first condition, associating the compressed data with the vector register to enable loading the compressed data to the vector register.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings:

FIG. 4 illustrates a schematic diagram of an exemplary matrix, consistent with some embodiments of the present disclosure.

DETAILED DESCRIPTION

Figure 1A:
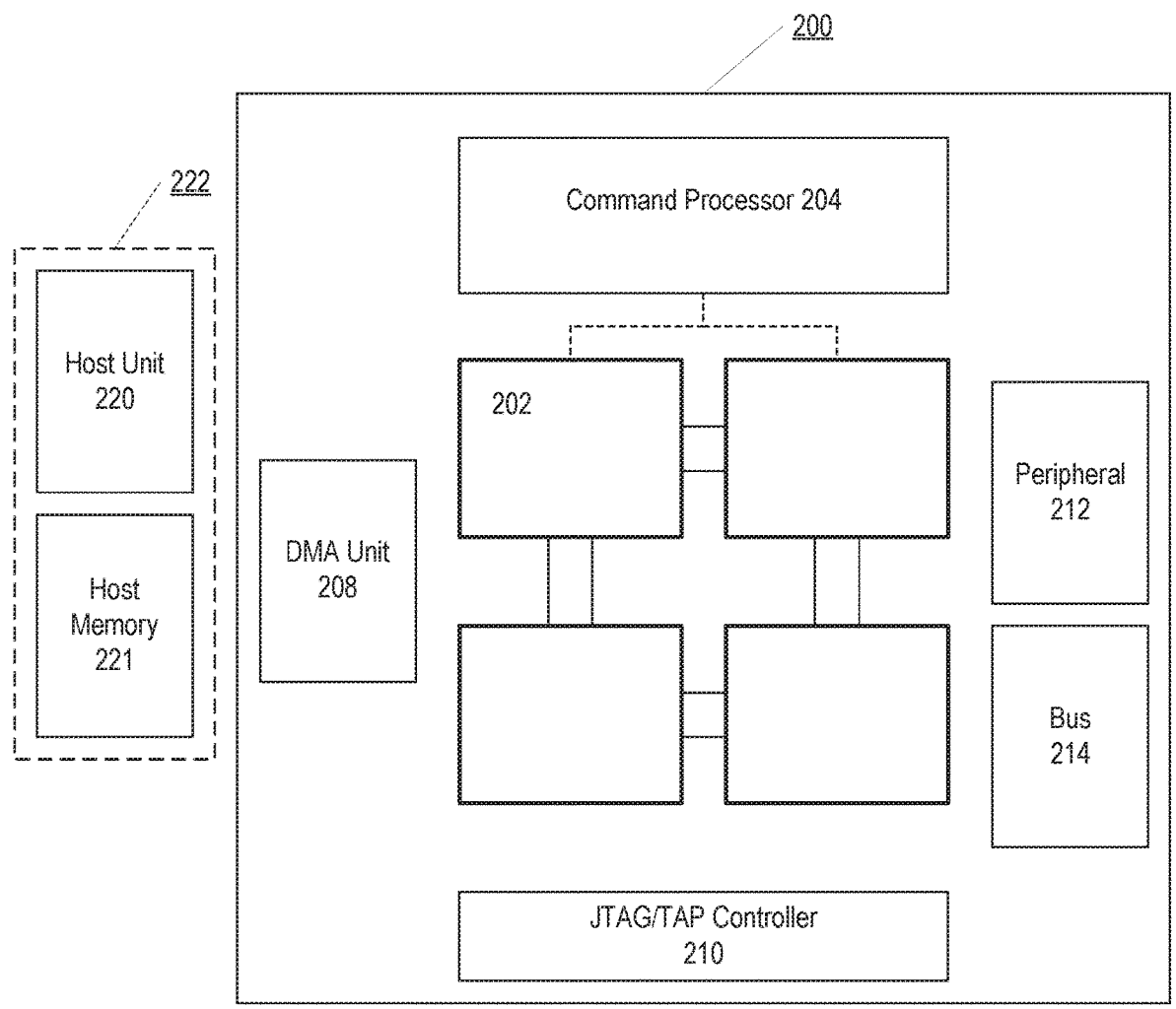
FIG. 1A illustrates a schematic diagram of an exemplary neural network accelerator core architecture, consistent with some embodiments of the present disclosure.

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

In a neural network system, larger models such as deep learning models may require more memory and computational resources. To reduce resource requirements, pruning may be used to reduce the size of a model in the neural network system. In one example, pruning includes setting individual weight elements in a weight matrix to zero. As the number of the individual weight elements increases, sparsity of the weight elements of the weight matrix can also increase. In other words, fewer elements are present in the weight matrix such that accuracy is decreased by pruning. Thus, one drawback of pruning is preserving computing resources by maintaining fewer elements for calculation at the cost of losing model accuracy.

Some conventional structured pruning strategies leverage an accelerator's (e.g., CPU's or GPU's) memory hierarchy for better locality, or leverage an accelerator's Single Instruction Multiple Data (SIMD) execution engine for data parallelism. The SIMD execution engine can perform the same operation on multiple data points simultaneously with multiple processing elements. The engine exploits data level parallelism, but not concurrency. There are simultaneous computations, but only a single process or instruction at a given time.

Some conventional systems may reduce model size to achieve high execution efficiency, but with little consideration of how to trade off between model accuracy and size reduction with the same execution efficiency. Some conventional systems attempt to address the tradeoff but can only be applied to architectures such as Graph Processing Units (GPUs) with memory hierarchies. One example is a system based on hardware latency hysteresis effect due to data locality of underlying cache hierarchy. Although the overall execution efficiency increases as more rows or columns of the model are pruned, execution efficiency may intermittently worsen as pruning is performed.

Some conventional model compression based on unstructured pruning or random pruning can significantly reduce the model size, but the pruned model of the model compression may not achieve high execution efficiency since existing accelerator architectures lack efficient support on data sparsity. Alternatively, conventional model compression based on structured pruning attempts to remove an entire row or column of model weights so that the remaining weights can stay in the same cache line or can be executed in SIMD instructions. Such conventional model compression may improve execution efficiency but often results in noticeable model precision loss due to undesired removal of weights in model feature maps.

FIG. 1A illustrates an exemplary neural network accelerator architecture 200, consistent with embodiments of the present disclosure. In the present disclosure, neural network accelerator architecture 200 may also be referred to as a machine learning accelerator or deep learning accelerator. In some embodiments, accelerator architecture 200 may also be referred to as a neural network processing unit (NPU) architecture 200. As shown in FIG. 1A, accelerator architecture 200 can include a plurality of cores 202, a command processor 204, a direct memory access (DMA) unit 208, a Joint Test Action Group (JTAG)/Test Access Port (TAP) controller 210, a peripheral interface 212, a bus 214, and the like.

Cores 202 can perform algorithmic operations based on communicated data. Cores 202 can include one or more processing elements that may include single instruction, multiple data (SIMD) architecture including one or more processing units configured to perform one or more operations (e.g., multiplication, addition, multiply-accumulate, etc.) based on commands received from command processor 204. To perform operations on the communicated data packets from a host unit 220 or a host memory 221, described more fully below, cores 202 can include one or more processing elements for processing information in the data packets. Each processing element may comprise any number of processing units. According to some embodiments of the present disclosure, accelerator architecture 200 may include a plurality of cores 202, e.g., four cores. In some embodiments, the plurality of cores 202 can be communicatively coupled with each other. For example, the plurality of cores 202 can be connected with a single directional ring bus, which supports efficient pipelining for large neural network models. The architecture of cores 202 will be explained in detail below with respect to FIG. 1B.

Command processor 204 can interact with host unit 220 and pass pertinent commands and data to one or more corresponding cores 202. In some embodiments, command processor 204 can interact with host unit 220 under the supervision of a kernel mode driver (KMD). In some embodiments, command processor 204 can modify the pertinent commands to each core 202, so that cores 202 can work in parallel as much as possible. The modified commands can be stored in an instruction buffer. In some embodiments, command processor 204 can be configured to coordinate operation of one or more cores 202 for parallel execution.

DMA unit 208 can assist with transferring data between host memory 221 of host unit 220 and accelerator architecture 200. For example, DMA unit 208 can assist with loading data or instructions from host memory 221 into local memory of cores 202. DMA unit 208 can also assist with transferring data between multiple accelerators. DMA unit 208 can allow off-chip devices to access both on-chip and off-chip memory without causing a host CPU interrupt. In addition, DMA unit 208 can assist with transferring data between components of accelerator architecture 200. For example, DMA unit 208 can assist with transferring data between multiple cores 202 or within each core. Thus, DMA unit 208 can also generate memory addresses and initiate memory read or write cycles. DMA unit 208 also can contain several hardware registers that can be written and read by the one or more processors, including a memory address register, a byte-count register, one or more control registers, and other types of registers. These registers can specify some combination of a source, a destination, the direction of data transfer (reading from an input/output (I/O) device or writing to the I/O device), the size of a transfer unit, or a number of bytes to transfer in one burst. It is appreciated that accelerator architecture 200 can include a second DMA unit, which can be used to transfer data with other accelerator architectures to allow multiple accelerator architectures to communicate directly without involving host unit 220.

JTAG/TAP controller 210 can specify a dedicated debug port implementing a serial communications interface (e.g., a JTAG interface) for low-overhead access to accelerator architecture 200 without requiring direct external access to system address and data buses. JTAG/TAP controller 210 can also have an on-chip test access interface (e.g., a TAP interface) that implements a protocol to access a set of test registers that present chip logic levels and device capabilities of various parts.

Peripheral interface 212 (such as a PCIe interface), if present, serves as an (and typically the) inter-chip bus, providing communication between accelerator architecture 200 and other devices.

Bus 214 (such as an $I^2C$ bus) may include both intra-chip and inter-chip buses. The intra-chip bus connects all internal components to one another as called for by the system architecture. While not all components are connected to every other component, all components do have some connection to other components with which they need to communicate. The inter-chip bus connects accelerator architecture 200 with other devices, such as off-chip memory (e.g., host memory 221) or peripherals. For example, bus 214 can provide high speed communication across cores and can also connect cores 202 with other units, such as the off-chip memory or peripherals. Typically, if there is a peripheral interface 212 (e.g., the inter-chip bus), bus 214 is solely concerned with intra-chip buses, though in some implementations it can still be concerned with specialized inter-bus communications.

Accelerator architecture 200 can also communicate with host unit 220. Host unit 220 can include one or more processing units (e.g., an X86 central processing unit). As shown in FIG. 1A, host unit 220 may be associated with host memory 221. In some embodiments, host memory 221 may be a memory integral to host unit 220 or an external memory associated with host unit 220. In some embodiments, host memory 221 may comprise a host disk, which is an external memory configured to provide additional memory for host unit 220. Host memory 221 can be a double data rate synchronous dynamic random-access memory (e.g., DDR SDRAM) or the like. Host memory 221 can be configured to store a large amount of data with slower access speed, compared to an on-chip memory integrated within accelerator chip, acting as a higher-level cache. The data stored in host memory 221 may be transferred to accelerator architecture 200 to be used for executing neural network models.

In some embodiments, a host system 222 comprising host unit 220 and host memory 221 can comprise a compiler (not shown). The compiler is a program or computer software that transforms computer codes written in one programming language into instructions for accelerator architecture 200 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system 222 including the compiler may push one or more commands to accelerator architecture 200. As discussed above, these commands can be further processed by command processor 204 of accelerator architecture 200, temporarily stored in an instruction buffer of accelerator architecture 200, and distributed to corresponding one or more cores (e.g., cores 202) or processing elements. Some of the commands may instruct a DMA unit (e.g., DMA unit 208) to load instructions and data from host memory (e.g., host memory 221) into accelerator architecture 200. The loaded instructions may then be distributed to each core (e.g., core 202 assigned with the corresponding task, and the one or more cores may process these instructions.

Figure 1B:
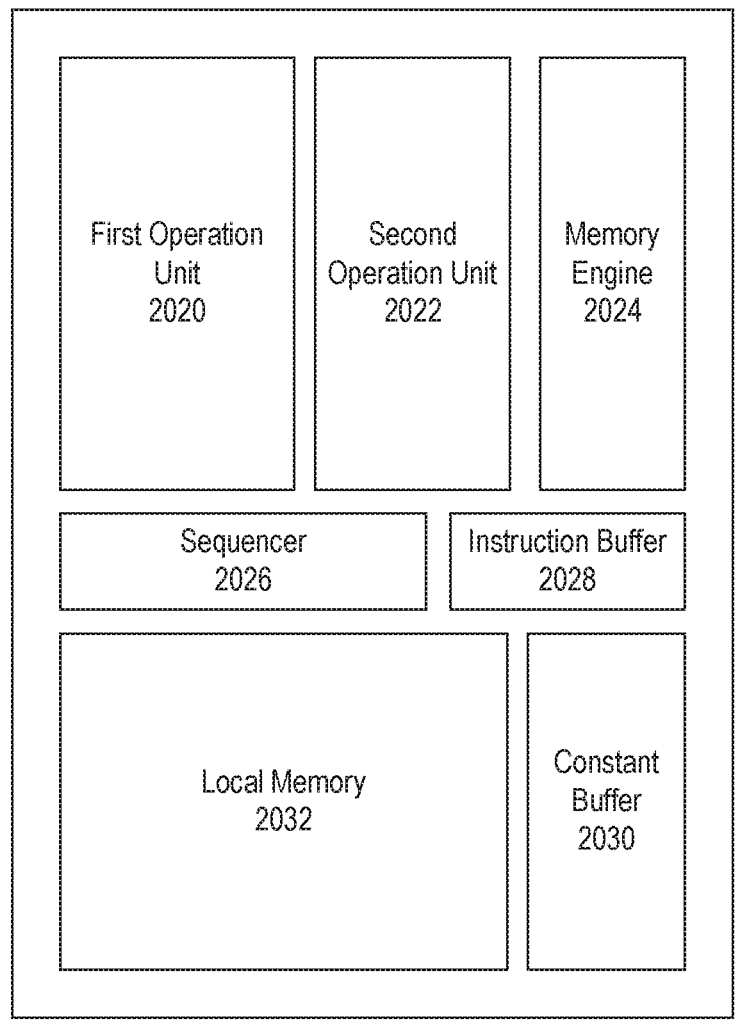
FIG. 1B illustrates a schematic diagram of an exemplary neural network accelerator core architecture, consistent with some embodiments of the present disclosure.

It is appreciated that the first few instructions received by cores 202 may instruct cores 202 to load/store data from host memory 221 into one or more local memories of the cores (e.g., local memory 2032 of FIG. 1B). Each core 202 may then initiate an instruction pipeline, which involves fetching the instruction (e.g., via a sequencer) from the instruction buffer, decoding the instruction (e.g., via DMA unit 208), generating local memory addresses (e.g., corresponding to an operand), reading the source data, executing or loading/storing operations, and then writing back results.

According to some embodiments, accelerator architecture 200 can further include a global memory (not shown) having memory blocks (e.g., four blocks of 8 GB second generation of high bandwidth memory (HBM2)) to serve as main memory. In some embodiments, the global memory can store instructions and data from host memory 221 via DMA unit 208. The instructions can then be distributed to an instruction buffer of each core assigned with the corresponding task, and the core can process these instructions accordingly.

In some embodiments, accelerator architecture 200 can further include a memory controller (not shown) configured to manage reading and writing of data to and from a specific memory block (e.g., HBM2) within global memory. For example, the memory controller can manage read/write data coming from the core of another accelerator (e.g., from DMA unit 208 or a DMA unit corresponding to the another accelerator) or from core 202 (e.g., from a local memory in core 202). It is appreciated that more than one memory controller can be provided in accelerator architecture 200. For example, there can be one memory controller for each memory block (e.g., HBM2) within global memory.

The memory controller can generate memory addresses and initiate memory read or write cycles. The memory controller can contain several hardware registers that can be written and read by the one or more processors of cores 202. The hardware registers can include a memory address register, a byte-count register, one or more control registers, and other types of registers. These registers can specify some combination of source, destination, direction of transfer (reading from the input/output (I/O) device or writing to the I/O device), size of a transfer unit, number of bytes to transfer in one burst, or other typical features of memory controllers.

While accelerator architecture 200 of FIG. 1A can be used for convolutional neural networks (CNNs) in some embodiments of the present disclosure, it is appreciated that accelerator architecture 200 of FIG. 1A can be utilized in various neural networks, such as deep neural networks (DNNs), recurrent neural networks (RNNs), or the like. In addition, some embodiments can be configured for various processing architectures, such as neural network processing units (NPUs), graphics processing units (GPUs), field programmable gate arrays (FPGAs), tensor processing units (TPUs), application-specific integrated circuits (ASICs), any other types of heterogeneous accelerator processing units (HAPUs), or the like FIG. 1B illustrates an exemplary neural network accelerator core architecture, consistent with embodiments of the present disclosure. As shown in FIG. 1B, core 202 can include one or more operation units such as first and second operation units 2020 and 2022, a memory engine 2024, a sequencer 2026, an instruction buffer 2028, a constant buffer 2030, a local memory 2032, or the like.

One or more operation units can include first operation unit 2020 and second operation unit 2022. First operation unit 2020 can be configured to perform operations on received data (e.g., matrices). In some embodiments, first operation unit 2020 can include one or more processing units configured to perform one or more operations (e.g., multiplication, addition, multiply-accumulate, element-wise operation, etc.). In some embodiments, first operation unit 2020 is configured to accelerate execution of convolution operations or matrix multiplication operations.

Second operation unit 2022 can be configured to perform a pooling operation, an interpolation operation, a region-of-interest (ROI) operation, and the like. In some embodiments, second operation unit 2022 can include an interpolation unit, a pooling data path, and the like.

Memory engine 2024 can be configured to perform a data copy within a corresponding core 202 or between two cores. DMA unit 208 can assist with copying data within a corresponding core or between two cores. For example, DMA unit 208 can support memory engine 2024 to perform data copying from a local memory (e.g., local memory 2032) into one of operation units 2020 or 2022. Memory engine 2024 can also be configured to perform matrix transposition to make the matrix suitable for use in the operation unit.

Sequencer 2026 can be coupled with instruction buffer 2028 and configured to retrieve commands and distribute the commands to components of core 202. For example, sequencer 2026 can distribute convolution commands or multiplication commands to first operation unit 2020, distribute pooling commands to second operation unit 2022, or distribute data copy commands to memory engine 2024. Sequencer 2026 can also be configured to monitor execution of a neural network task and parallelize sub-tasks of the neural network task to improve efficiency of the execution. In some embodiments, first operation unit 2020, second operation unit 2022, and memory engine 2024 can run in parallel under control of sequencer 2026 according to instructions stored in instruction buffer 2028.

Instruction buffer 2028 can be configured to store instructions belonging to the corresponding core 202. In some embodiments, instruction buffer 2028 is coupled with sequencer 2026 and provides instructions to sequencer 2026. In some embodiments, instructions stored in instruction buffer 2028 can be transferred or modified by command processor 204.

Constant buffer 2030 can be configured to store constant values. In some embodiments, constant values stored in constant buffer 2030 can be used by operation units such as first operation unit 2020 or second operation unit 2022 for batch normalization, quantization, de-quantization, or the like.

Local memory 2032 can provide storage space with fast read/write speed. To reduce possible interaction with a global memory, storage space of local memory 2032 can be implemented with large capacity. With such large capacity storage space, most data access can be performed within core 202 with reduced latency caused by data access. In some embodiments, to minimize data loading latency and energy consumption, SRAM (static random access memory) integrated on chip can be used as local memory 2032. In some embodiments, local memory 2032 can have a capacity of 192 MB or more. According to some embodiments of the present disclosure, local memory 2032 can be evenly distributed on chip to relieve dense wiring and heating issues.

Figure 1C:
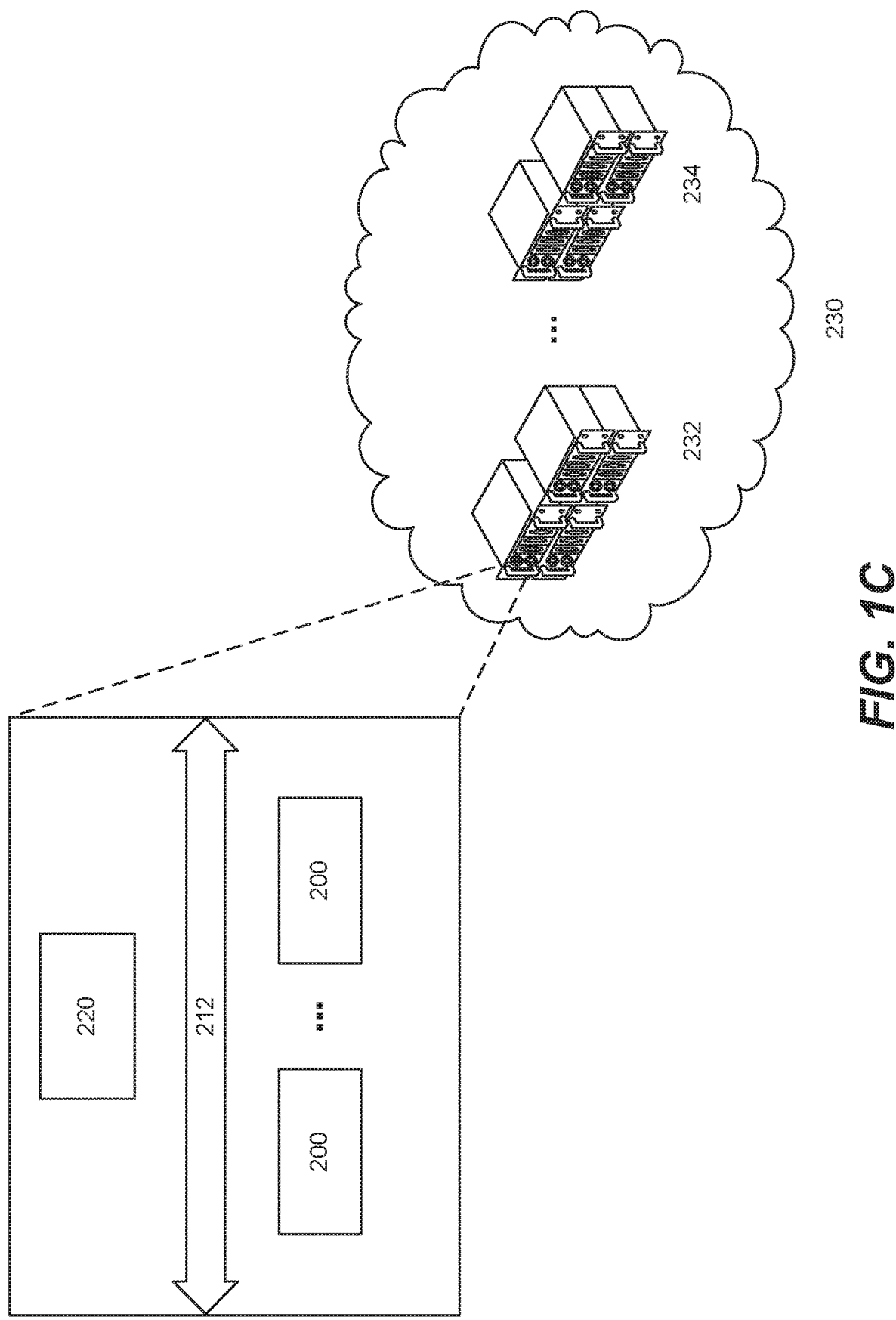
FIG. 1C illustrates a schematic diagram of an exemplary cloud system incorporating a neural network accelerator, consistent with embodiments of the present disclosure.

FIG. 1C illustrates a schematic diagram of an exemplary cloud system 230 incorporating accelerator architecture 200, consistent with embodiments of the present disclosure. As shown in FIG. 1C, cloud system 230 can provide a cloud service with artificial intelligence (AI) capabilities and includes a plurality of computing servers (e.g., servers 232 and 234). In some embodiments, each of computing servers 232 and 234 can, for example, incorporate a neural network accelerator architecture such as architecture 200 of FIG. 1A. Neural network accelerator architecture 200 is shown in FIG. 1C in a simplified manner for simplicity and clarity as incorporated in server 232.

With the assistance of neural network accelerator architecture 200, cloud system 230 can provide extended AI capabilities of image recognition, facial recognition, translations, 3D modeling, and the like. It is appreciated that neural network accelerator architecture 200 can be deployed to computing devices in other forms. For example, neural network accelerator architecture 200 can also be integrated in a computing device, such as a smart phone, a tablet, and a wearable device.

The disclosed embodiments provide improvements over conventional systems and methods for reducing model sizes of neural network models. For example, in some embodiments, a number of weight elements in a matrix is monitored after each pruning to determine whether further pruning is needed or can be stopped. The determination can be based on a comparison between the number of elements and a number of registers in a vector register in which the number of weight elements are loaded. The pruning is restricted in relation to the vector register.

Figure 2:
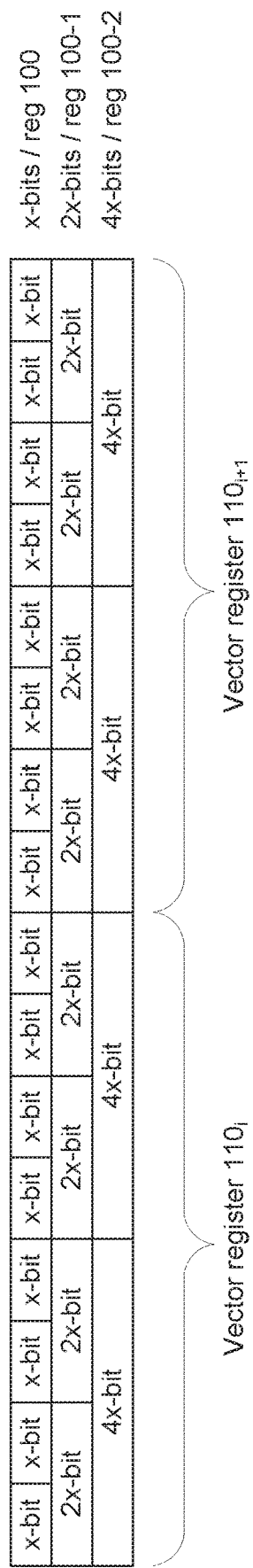
FIG. 2 illustrates a schematic diagram of an exemplary vector extension of an Instruction Set Architecture (ISA), consistent with some embodiments of the present disclosure.

Moreover, in some embodiments, the structure of the vector register can be adjusted such that longer length registers are used to accommodate the elements for higher accuracy as variable-length vectors of Instruction Set Architecture (ISA) are used. In comparison to conventional systems where registers in the vector registers have fixed length, using variable-length vectors provides an improvement. FIG. 2 illustrates a schematic diagram of an exemplary vector extension of an ISA, consistent with some embodiments of the present disclosure. The exemplary ISA can be RISC-V, which is a free and open ISA that is based on reduced ISA. In the exemplary ISA, each register in a vector register (e.g., a vector register $110_i$ or a vector register $110_{i+1}$) can have a variable length. The length of each register can be equal to a power of two bits. For example, vector registers can be formed by registers 100 which each have x bits, registers 100-1 which each have a doubled length of 2x bits, or registers 100-2 which each have a length of 4x bits. When data is associated with a vector register, each element of data, i.e., each weight element, can be associated with register 100, register 100-1, or register 100-2.

Figure 3:
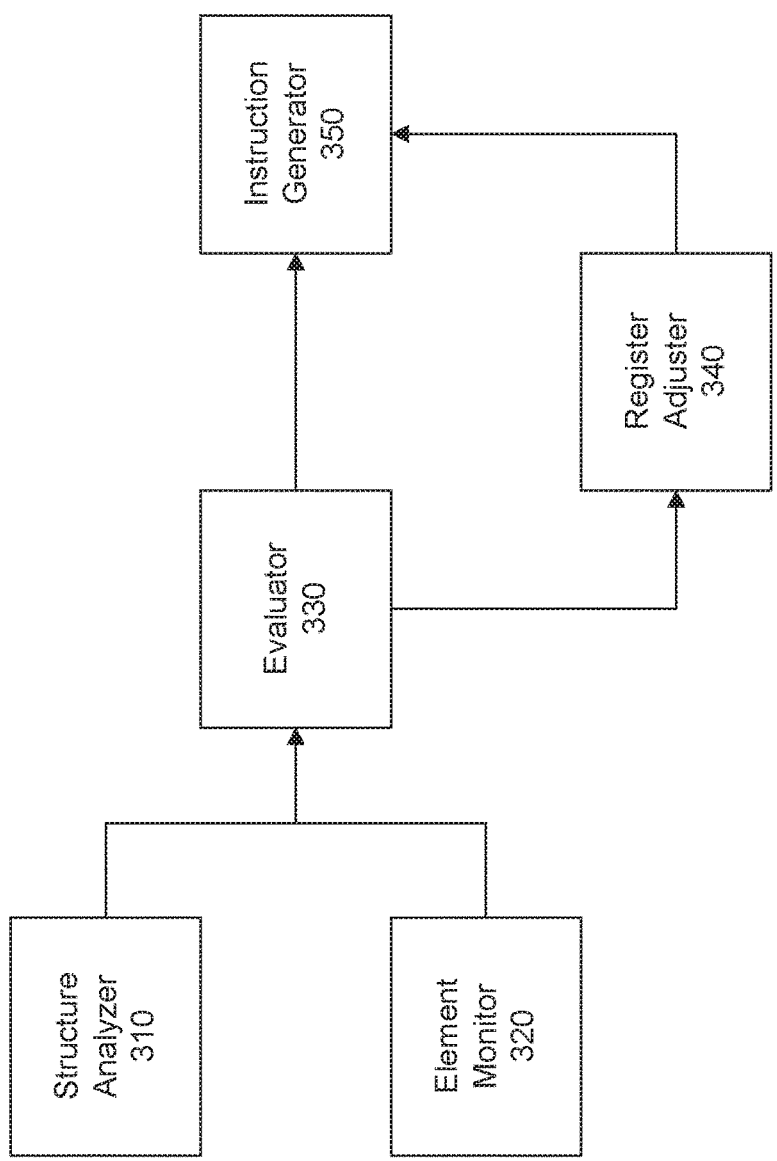
FIG. 3 illustrates a schematic diagram of an exemplary data association system, consistent with some embodiments of the present disclosure.

FIG. 3 illustrates a schematic diagram of an exemplary data association system 300, consistent with some embodiments of the present disclosure.

Exemplary data association system 300 can be used in a neural network system to facilitate pruning of models. Data association system 300 employs an exemplary ISA having variable-length vectors that can include multiple vector registers. Each vector register can include multiple registers. Exemplary data association system 300 associates data with a vector register by comparing a number of registers in the vector register with two thresholds to determine whether a current structure of the vector register can be used to associate with the data. If comparison with one of the thresholds indicates that adjustment of the vector register structure can facilitate association of data with the vector register, the system adjusts the structure of the vector register.

Data association system 300 can include a structure analyzer 310, an element monitor 320, an evaluator 330, a register adjuster 340, and an ISA generator 350. Register adjuster 340 is optional. Data association system 300 obtains information regarding vector registers and data of interest for comparison via structure analyzer 310 and element monitor 320. Referring back to FIG. 2B, one or more of first operation unit 2020, second operation unit 2022, and local memory 2032 can include such vector registers for storing input data and output data.

Structure analyzer 310 can identify structure information of a vector register including a total number of the registers in the vector register and a length of each register. Data association system 300 employs ISA with variable-length vectors, e.g., RISC-V which has a vector extension where the length of each register can be adjusted.

FIG. 4 illustrates a schematic diagram of an exemplary weight matrix 400 in a neural network system. An example of the operation of data association system 300 is described next with reference to weight matrix 400. Weight matrix 400 can have several weight elements, e.g., $W_{11}, \ldots, W_{mn}$. Each element of weight matrix 400 can be associated with one register, e.g., register 100, 100-1, or 100-2, in a vector register, e.g., vector register $110_i$ or $110_{i+1}$. Referring also to FIG. 3, element monitor 320 determines and monitors the number of elements in the weight matrix. Each time a pruning is performed, element monitor 320 counts the number of elements in weight matrix 400. The number of the elements decreases as a result of each pruning operation. Evaluator 330 compares the number of the elements with two thresholds, as described more fully below.

In some embodiments, the elements in the weight matrix result from a pruning operation performed on the weight matrix. In the neural network system, the weight matrix is pruned by identifying weight elements that can be approximated as zero and setting the identified weight elements to zero. As the pruning operation is performed, the number of elements in the weight matrix becomes smaller such that less computation is required when the elements are used in calculation. Referring to FIG. 4 again, different forms of pruning can be performed on the elements of weight matrix 400. For example, structured pruning may be used to compress models in neural networks to improve runtime performance. Pruning can be row-based, being performed on elements $W_{11}$ to $W_{1n}$; column-based, being performed on elements $W_{11}$ to $W_{m1}$; tile-based, being performed on $W_{11}$, $W_{12}$, $W_{21}$, and $W_{22}$; or irregular pattern-based.

Figure 5:
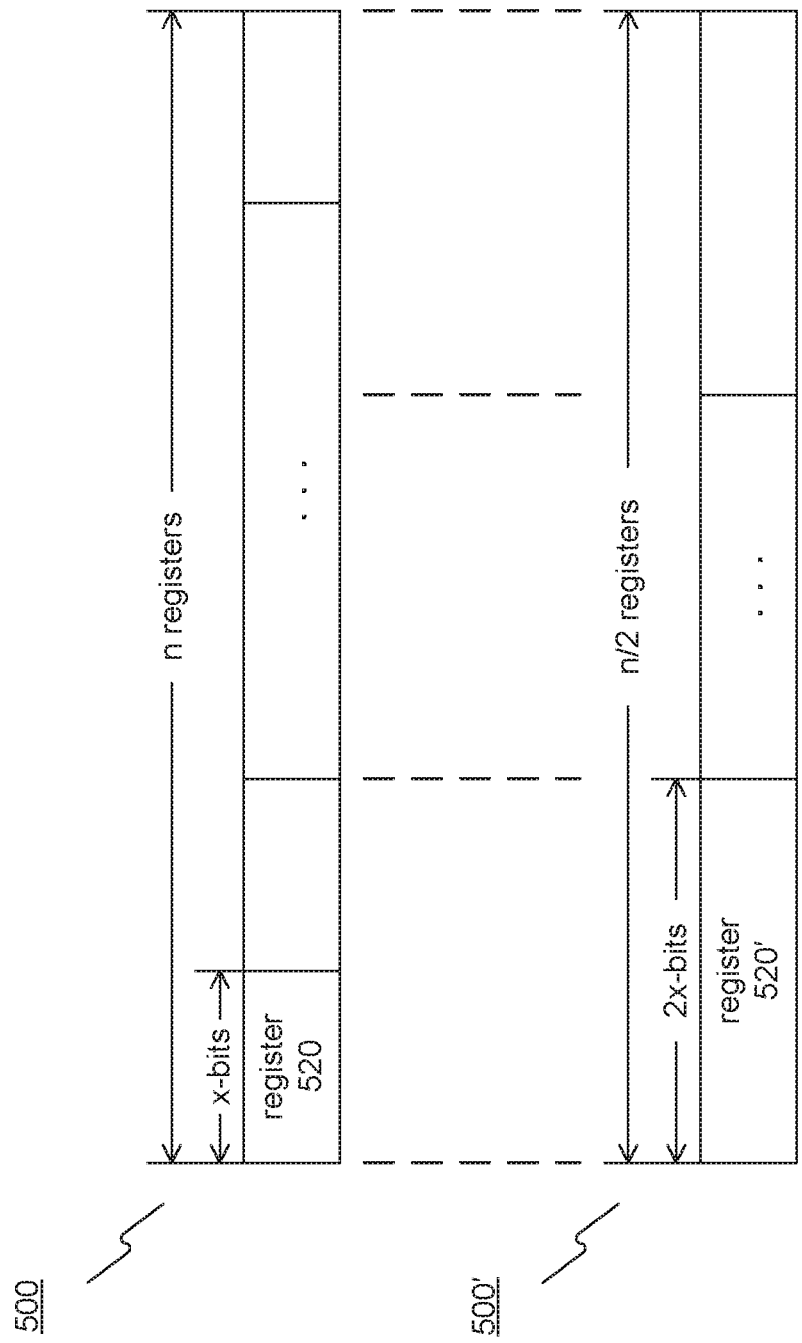
FIG. 5 illustrates a schematic diagram of an exemplary vector register, consistent with some embodiments of the present disclosure.

As noted above, evaluator 330 compares information obtained by structure analyzer 310 and element monitor 320. Referring to FIG. 3, evaluator 330 compares the number of elements in the data as determined by element monitor 320 with a first of the above-mentioned two thresholds. The first threshold can be determined based on the number of registers in the vector register as determined by structure analyzer 310. Thus, data association system 300 can set the first threshold as the number of registers in the vector register. Data association system 300 then determines whether the structure of the vector register is suitable for the number of elements in the weight matrix, and whether to make adjustments to the structure of the vector register. FIG. 5 is a schematic diagram of an exemplary vector register 500. Vector register 500 has multiple registers, one of the registers being denoted as register 520. Each register 520 is available to store one weight element of weight matrix 400. The exemplary RISC-V vector extension has 32 vector registers. Multiple vector registers can form a group. Vector instructions execute all elements in a vector group unless some elements are masked off.

Evaluator 330 performs the comparison to the first threshold to determine whether the pruning operation is sufficient and can be stopped. In an example, a vector group has one vector register 500 shown in FIG. 5 having a length of 512 bits. When vector register 500 has 32 registers 520, each register 520 has 16 bits. The first threshold is therefore set to 32. In the example, after one pruning operation on a weight matrix, e.g., weight matrix 400, the number of elements left in the weight matrix is 23. Evaluator 330 compares the number of the elements in the weight matrix, which is 23, with the first threshold of 32, the number of registers, and determines that the number of the elements is less than the first threshold. Therefore, after the current round of pruning, the number of elements in the weight matrix is less than the number of registers, with 23 registers among 32 registers 520 associated with the 23 elements in the weight matrix. In this scenario, since the number of elements is less than the number of the registers, there are sufficient registers to be associated with the elements. Therefore, no further pruning is necessary. In some embodiments, an indication to end the pruning performed on the data can be sent by evaluator 330 to an exemplary element pruner (not shown in FIG. 3) that performs pruning on the data when the number of the elements is determined to be less than the number of registers. If another round of pruning is performed, 23 elements may be further reduced to a smaller number, e.g., 20 elements, but since the total length of the vector register remains 512 bits, and the 16 bit length of each register has not changed, 20 of the 32 registers 520 are still associated with 20 elements, and 12 registers are not used in this case. When 32 registers 520 are sufficient to be associated with 23 elements, further pruning from 23 elements to 20 elements reduces the required number of registers 520 from 23 to 20, but 20 registers 520 and unused 12 registers 520 are involved in computation concurrently since all elements in one vector register are computed concurrently. The first threshold provided by some embodiments helps determine a reasonable point to stop pruning, since pruning reduces model sizes at the cost of lowering accuracy. Further pruning from 23 elements to 20 elements does not save computing resources but lowers the accuracy of the model having the weight matrix. Therefore, the current example again illustrates no further pruning is necessary when there are sufficient registers for the elements. Comparison between the number of elements with the first threshold number of registers determines whether the pruning can be stopped after the current round of pruning. In other scenarios, if the numbers of elements at the end of successive pruning rounds are, e.g., 43 and 33 respectively, both of which are larger than the first threshold (32), pruning continues and evaluator 330 continues to monitor the number of elements.

Evaluator 330 can compare the number of the elements with a second of the above-mentioned two thresholds. The second threshold is used to determine whether the structure of the vector register should be changed for data association. Comparison to the second threshold is to determine whether the structure of the vector register needs to be changed to facilitate association of the elements in the weight matrix with the vector register. The second threshold is determined based on the number of registers in the vector register. The second threshold is smaller than the first threshold. In some embodiments, the second threshold is one half of the first threshold. In some embodiments, the length of each register can be adjusted. Therefore, in a vector register, the number of the registers can be different and be the power of two, e.g., 16, 32 or 64 registers. The next level of fewer number of registers is one half of the current level, e.g., 16 being one half of 32. After a current round of pruning, the remaining elements may be much less than the current number of registers. For example, assuming that the number of remaining elements is 15, which is much less than 32. Then the current number of registers is also less than the next level 16. As a result, 16 is the second threshold used to be compared with the number of elements. Thus, in the present example, the current pruning operation results in the number of elements being reduced to a level at which the next available level of registers can be used. More particularly, in the present example, after the current pruning operation, 16 registers can be used instead of 32 to accommodate 15 elements, and at the same time accuracy is improved because 32 bits (number of bits of each register=length of vector register/number of registers) are used to associate with each of the elements instead of 16 bits.

Optional register adjuster 340 can adjust the structure of the vector register when it is determined that the number of elements is equal or smaller than the second threshold. The structure of the vector register includes a length of each register. The system can adjust the length of each register. As shown in FIG. 5, vector register 500 has n registers 520, each register 520 has x bits. After the system adjusts the length of register 520, register 520 becomes register 520'. In vector register 500', since the length of a register is adjusted to 2× bits, vector register 500' can have n/2 registers 520', each register 520' having 2× bits, while the total length of vector register is fixed.

ISA generator 350 can generate an instruction set based on the associated data to load the associated data to the vector register. If the number of the elements is equal or less than the first threshold, but greater than the second threshold, the structure of the vector register remains the same. If the number of the element is equal or less than the second threshold, ISA generator 350 generates the instruction set based on association between the data and the vector register to load the data to the vector register of which the structure is adjusted.

In some embodiments, the exemplary ISA includes multiple vector registers. Some vector registers can form a group. All elements associated with the vector registers in one group are executed simultaneously. The elements in a weight matrix can be associated with the vector registers in one group and executed simultaneously.

In neural network systems, pruning is used as a means of model compression to prune as many weight elements as possible until a pruning threshold is exceeded. A pruning operation can run more than once on a data collection for further pruning. However, pruning may not always increase runtime performance. Fewer elements due to pruning provide benefits of less computing power consumption, but fewer elements also cause accuracy loss of a model. The performance is increased at the cost of losing accuracy. Therefore, a solution to determining when to stop pruning based on pruning thresholds (e.g., the first threshold and the second threshold determined by evaluator 330 shown in FIG. 3) achieves balance between performance and accuracy. In one example, the remaining elements do not fill all element slots in a vector group after some elements are eliminated by pruning. The unfilled slots in the vector group are not used, because all elements in the vector group are executed simultaneously. The pruning can be stopped when the elements barely fit in the registers in the vector group (e.g., when the number of elements is less than the first threshold, which is the number of registers) before overpruning occurs. When the number of elements is less than the second threshold, which is one half of the number of registers, the system doubles the length of each register such that the number of bits to be associated with each element is doubled, increasing the accuracy of the model.

Figure 6:
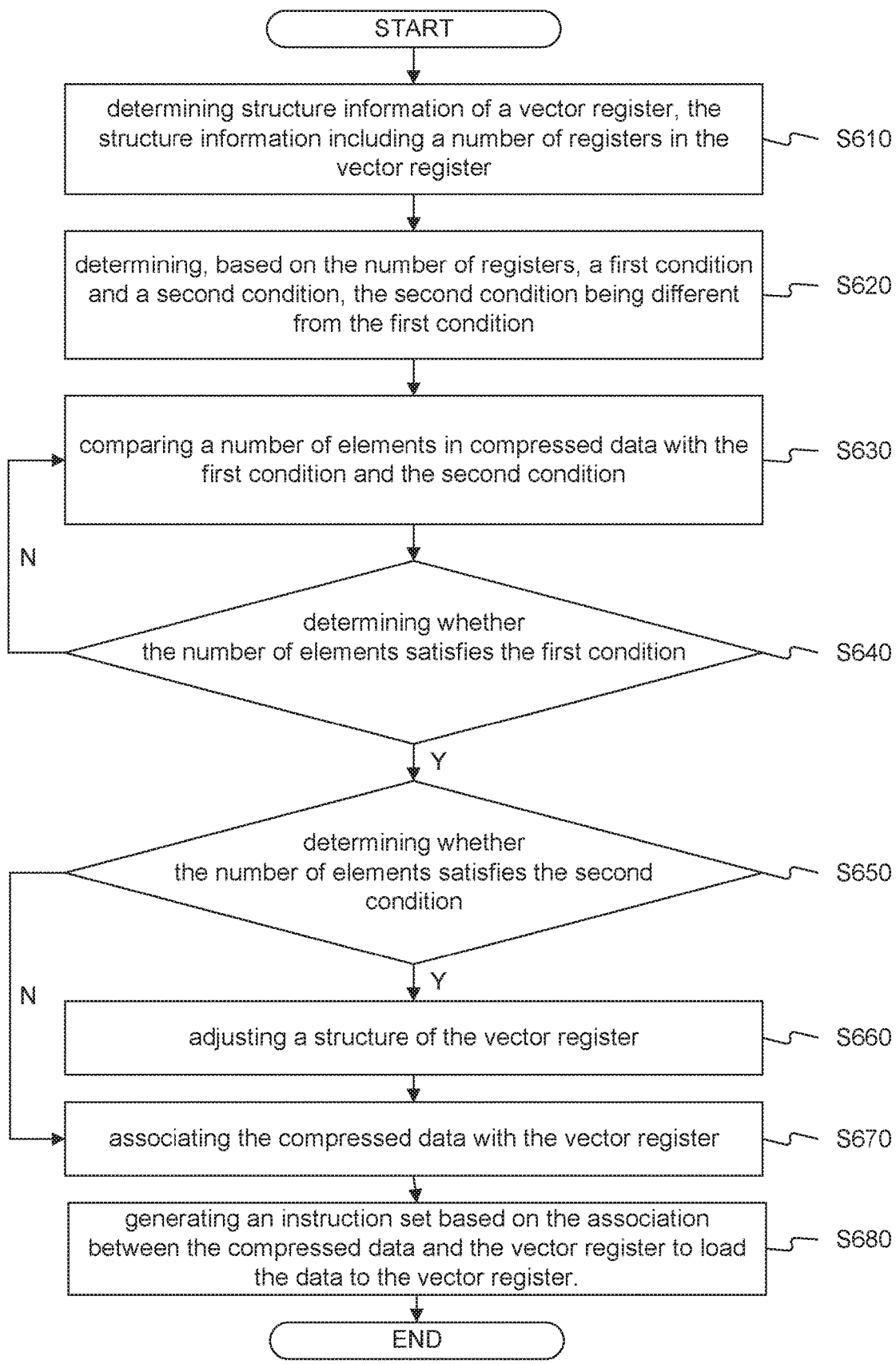
FIG. 6 illustrates a flow chart of an exemplary method for associating data with a vector register, consistent with some embodiments of the present disclosure.

FIG. 6 illustrates a flow chart of an exemplary method 600 for associating data with a vector register, consistent with some embodiments of the present disclosure. Association between the data and the vector register is determined to enable loading the data to the vector register. Both the number of elements in the data and the structure of the vector register determine how the data and the vector register are associated. In exemplary method 600, comparison between the number of elements in the data after compression and the structure of the vector register leads to the determination whether pruning can be ended and whether the structure of the vector register can be adjusted prior to associating the data with the vector register. The data can be a matrix, e.g., a weight matrix 400 in a neural network system as shown in FIG. 4. The weight matrix can have several elements of data, e.g., weight elements. Each element of the data can be associated with one register in the vector register. Method 600 can be performed by data association system 300 and includes the following steps.

In step S610, structure information of a vector register is determined, e.g., by structure analyzer 310 shown in FIG. 3. An exemplary instruction set architecture (e.g., RISC-V) of some embodiments can include multiple vector registers. Each vector register can include multiple registers. The structure information of the vector register can include a total number of registers in the vector register and a length of each register. The number of registers can be used to compare with the number of elements in the data before associating the data with the vector register and loading the data into the vector register.

In step S620, a first condition and a second condition are determined, e.g., by evaluator 330 shown in FIG. 3, based on the number of registers in the vector register. The first condition includes the first threshold, while the second condition includes the second threshold. The first threshold can be the same as the number of registers in the vector register. Each element of the data is associated with one register in the vector register. The first threshold can be subsequently used to compare with the number of elements in the data. The second threshold can be a one half of the first threshold. In the example shown in FIG. 5, vector register 500 has 32 registers 520, and each register 520 has 16 bits. The first threshold is set at 32, the number of registers, i.e., 32. In the vector register, the number of the registers can be different and be a power of two, e.g., 16, 32, or 64. The next level of a fewer number of registers is one half of a current level, e.g., 16 being one half of 32. Therefore, the second threshold is set at 16, which is one half the number of registers.

Referring back to FIG. 6, in step S630, a number of elements of the data is compared, e.g., by evaluator 330, with the first threshold and the second threshold. Model compression by pruning can be repeatedly performed on the weight matrix to achieve fewer elements to reduce the size of a neural network model. For example, pruning can be repeatedly performed on the elements of the data, to reduce the total number of the elements by each pruning operation. The number of the elements is monitored, e.g., by element monitor 320, as an indicator of the effect of the pruning each time.

In step S640, it is determined, e.g., by evaluator 330, whether the number of elements is equal to or smaller than the first threshold. If the number of elements is equal to or smaller than the first threshold, method 600 proceeds to step S650. In the example discussed above with reference to FIG. 5, after one pruning operation on the weight matrix, the number of elements left in the weight matrix is 23, which is smaller than the number of registers (32). In this scenario, the number of elements has dropped below the number of registers, there are sufficient registers to be associated with the elements and therefore no further pruning is necessary. An indication to end pruning can be sent when it is determined no more pruning is necessary. If it is determined at step 640 that the number of elements is larger than the first threshold, method 600 returns to step S630. For example, if it is determined at step 640 that there are 43 elements left after a pruning operation, method 600 returns to step 630. This is because the number of elements is larger than the number of registers. Since one register is associated with one element, 32 registers cannot accommodate 43 elements in the data, and further pruning is necessary. The number of elements continues to be monitored to determine whether after each pruning, the number of elements is less than the number of registers.

Still referring to FIG. 6, in step S650, after it is determined at step 640 that the number of elements is equal or smaller than the first threshold, it is determined (e.g., by evaluator 330) whether the number of elements is equal to or smaller than the second threshold. If the number of elements is equal or smaller than the second threshold, method 600 proceeds to step S660. In the example of the second threshold being 16, after the current round of pruning, the remaining elements may be much less than the current number of registers. For example, a number of remaining elements of 15 is much less than 32, the current number of registers, and also less than the next level 16 registers, which is also the second threshold. As a result, 16 registers instead of 32 registers can be used to accommodate the 15 elements. Since the length of the register can be adjusted, each of 16 registers is adjusted to a length of 32 bits to be associated with each of the 15 elements. This is in contrast to the example of 32 elements, each of 32 registers having 16 bits to be associated with each of 32 elements. As the pruning reduces the number of the elements, the embodiments provide capacity for increased bits in each register to improve accuracy. If the number of elements is larger than the second threshold, method 600 proceeds to step S670. In this scenario, no adjustment of the structure of the vector register is necessary.

In step S660, when the number of elements is equal or smaller than the second threshold, a structure of the vector register is adjusted, e.g., by register adjuster 340. The exemplary ISA can have a vector extension where the length of each register can be adjusted. In the example shown in FIG. 5, vector register 500 has n registers 520, each register 500 having x bits. After the length of register 520 is adjusted, register 520 becomes register 520'. In vector register 500', since the length of a register is adjusted to 2× bits, vector register 500' can have n/2 registers 520', each register 520' having 2× bits while the total length of the vector register remains fixed.

In step S670, the data is associated with the vector register, e.g., by instruction generator 350. If the structure of the vector register is adjusted, the data is associated with the vector register having the adjusted structure. In the example shown in FIG. 5, after adjustment of the structure of vector register 500, each element is associated with register 520' instead of register 520. The adjusted register 520' has 2 times the length of register 520.

In step S680, an instruction set is generated, e.g., by instruction generator 350, based on association between the data and the vector register to load the data to the vector register. If the number of elements is equal or less than the second threshold, the instruction set is generated based on association between the data and the vector register having the adjusted structure.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. It is understood that multiple ones of the above described modules/units may be combined as one module/unit, and each of the above described modules/units may be further divided into a plurality of sub-modules/sub-units.

Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

The embodiments may further be described using the following clauses:

1. A method for associating data with a vector register, comprising:
   compressing data of the neural network model;
   identifying structure information of a vector register, wherein the structure information includes a number of registers included in the vector register;
   comparing a number of elements in the compressed data with a first condition, wherein the first condition is determined based on the number of registers in the vector register; and
   in response to the number of elements satisfying the first condition, associating the compressed data with the vector register to enable loading the compressed data to the vector register.
2. The method of clause 1, further comprising:
   comparing the number of elements with a second condition, wherein the second condition is determined based on the number of registers in the vector register, and is different from the first condition; and
   adjusting a structure of the vector register in response to the number of elements satisfying the second condition.
3. The method of clause 1 or 2, wherein compressing the data of the neural network model comprises pruning of the data.
4. The method of any one of clauses 1 to 3, wherein the data is a weight matrix of the neural network model.
5. The method of clause 2, wherein adjusting the structure of the vector register comprises:
   reducing the number of registers in the vector register by one half.
6. The method of any one of clauses 2 to 5, wherein satisfying the first condition comprises being equal to or smaller than the number of registers in the vector register, and satisfying the second condition being equal to or smaller than one half of the number of registers in the vector register.
7. The method of clause 1, wherein compressing the data of the neural network model comprises a first operation of compression, the method further comprising:
   performing a second operation of compression of the data in response to the number of elements not satisfying the first condition.
8. The method of any one of clauses 1 to 7, further comprising:
   generating an instruction set based on the association between the compressed data and the vector register to load the compressed data to the vector register.
9. The method of clause 1, further comprising:
   in response to the number of elements satisfying the first condition, sending an indication to end compression of the data.
10. The method of any one of clauses 1 to 9, wherein the vector register is part of a group of vector registers that include elements that are executed simultaneously.
11. An apparatus for reducing a size of a neural network model, comprising:
    a memory storing a set of instructions; and
    one or more processors configured to execute the set of instruction to cause the apparatus to perform:
    compressing data of the neural network model,
    identifying structure information of a vector register, wherein the structure information includes a number of registers included in the vector register,
    comparing a number of elements in the compressed data with a first condition, wherein the first condition is determined based on the number of registers in the vector register, and
    in response to the number of elements satisfying the first condition, associating the compressed data with the vector register to enable loading the compressed data to the vector register.
12. The apparatus of clause 11, wherein the one or more processors are configured to execute the set of instructions to cause the apparatus to further perform:
    comparing the number of elements with a second condition, wherein the second condition is determined based on the number of registers in the vector register, and is different from the first condition, and
    adjusting a structure of the vector register in response to the number of elements satisfying the second condition.
13. The apparatus of clause 11 or 12, wherein compressing the data of the neural network model comprises pruning of the data.
14. The apparatus of any one of clauses 11 to 13, wherein the data is a weight matrix of the neural network model.
15. The apparatus of clause 12, wherein adjusting the structure of the vector register comprises:
    reducing the number of registers in the vector register by one half.
16. The apparatus of any one of clauses 12 to 15, wherein satisfying the first condition comprises being equal to or smaller than the number of registers in the vector register, and satisfying the second condition being equal to or smaller than one half of the number of registers in the vector register.
17. The apparatus of clause 11, wherein compressing the data of the neural network model comprises a first operation of compression, the method further comprising:

performing a second operation of compression of the data in response to the number of elements not satisfying the first condition.

18. The apparatus of any one of clauses 11 to 17, wherein the one or more processors are configured to execute the set of instructions to cause the apparatus to further perform:
generating an instruction set based on the association between the compressed data and the vector register to load the compressed data to the vector register.

19. The apparatus of clause 11, wherein the one or more processors are configured to execute the set of instructions to cause the apparatus to further perform:
in response to the number of elements satisfying the first condition, sending an indication to end compression of the data.

20. The apparatus of any one of clauses 11 to 19, wherein the vector register is part of a group of vector registers that include elements that are executed simultaneously.

21. A non-transitory computer readable medium that stores a set of instructions that is executable by at least one processor of a computer to cause the computer to perform a method for reducing a size of a neural network model, the method comprising:
compressing data of the neural network model;
identifying structure information of a vector register, wherein the structure information includes a number of registers included in the vector register;
comparing a number of elements in the compressed data with a first condition, wherein the first condition is determined based on the number of registers in the vector register; and
in response to the number of elements satisfying the first condition, associating the compressed data with the vector register to enable loading the compressed data to the vector register.

22. The non-transitory computer readable medium of clause 21, wherein the set of instructions that are executable by the at least one processor of a computer to cause the computer to further perform:
comparing the number of elements with a second condition, wherein the second condition is determined based on the number of registers in the vector register, and is different from the first condition; and
adjusting a structure of the vector register in response to the number of elements satisfying the second condition.

23. The non-transitory computer readable medium of clause 21 or 22, wherein compressing the data of the neural network model comprises pruning of the data.

24. The non-transitory computer readable medium of any one of clauses 21 to 23, wherein the data is a weight matrix of the neural network model.

25. The non-transitory computer readable medium of clause 22, wherein adjusting the structure of the vector register comprises:
reducing the number of registers in the vector register by one half.

26. The non-transitory computer readable medium of any one of clauses 22 to 25, wherein satisfying the first condition comprises being equal to or smaller than the number of registers in the vector register, and satisfying the second condition being equal to or smaller than one half of the number of registers in the vector register.

27. The non-transitory computer readable medium of clause 21, wherein compressing the data of the neural network model comprises a first operation of compression, the method further comprising:

performing a second operation of compression of the data in response to the number of elements not satisfying the first condition.

28. The non-transitory computer readable medium of any one of clauses 21 to 27, wherein the set of instructions that are executable by the at least one processor of a computer to cause the computer to further perform:
generating an instruction set based on the association between the compressed data and the vector register to load the compressed data to the vector register.

29. The non-transitory computer readable medium of clause 21, wherein the set of instructions that are executable by the at least one processor of a computer to cause the computer to further perform:
in response to the number of elements satisfying the first condition, sending an indication to end compression of the data.

30. The non-transitory computer readable medium of any one of clauses 21 to 29, wherein the vector register is part of a group of vector registers that include elements that are executed simultaneously.

31. A terminal, comprising:
a host unit; and
an apparatus reducing a size of a neural network model communicatively coupled to the host unit, the apparatus comprising:
a memory storing a set of instructions; and
one or more processors configured to execute the set of instruction to cause the apparatus to perform:
compressing data of the neural network model,
identifying structure information of a vector register, wherein the structure information includes a number of registers included in the vector register,
comparing a number of elements in the compressed data with a first condition, wherein the first condition is determined based on the number of registers in the vector register, and
in response to the number of elements satisfying the first condition, associating the compressed data with the vector register to enable loading the compressed data to the vector register.

32. A method for executing a neural network model by an accelerator, comprising:
receiving compressed data of the neural network model;
receiving a determination whether a number of elements in the compressed data of the neural network model satisfies a first condition, wherein the first condition is determined based on a number of registers in a vector register from a host; and
in response to determination that the number of elements satisfies the first condition, loading the compressed data to the vector register.

33. The method of clause 32, further comprising:
receiving, by an accelerator, a determination whether the number of elements in the compressed data of the neural network model satisfies a second condition, wherein the second condition is determined based on the number of registers in the vector register and is different from the first condition; and
in response to the determination that the number of elements satisfies the second condition, adjusting a structure of the vector register.

34. The method of clause 32 or 33, wherein the compressed data of the neural network model comprises pruned data.

35. The method of any one of clause 32 to 34, wherein the compressed data is a weight matrix of the neural network model.
36. The method of clause 33, wherein adjusting the structure of the vector register comprises:
reducing the number of registers in the vector register by one half.
37. The method of any one of clauses 33 to 36, wherein satisfying the first condition comprises being equal to or smaller than the number of registers in the vector register, and satisfying the second condition being equal to or smaller than one half of the number of registers in the vector register.
38. The method of clause 32, wherein the compressed data:
has been compressed based on a first operation of compression, or
has been compressed based on a second operation of compression and the first operation of compression in response to the number of elements not satisfying the first condition.
39. The method of any one of clauses 32 to 38, further comprising:
receiving an instruction set to load the compressed data to the vector register, wherein the instruction set is generated based on the association between the compressed data and vector register.
40. The method of any one of clauses 32 to 39, wherein the vector register is part of a group of vector registers that include elements that are executed simultaneously.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for reducing a size of a neural network model, comprising:
compressing data of the neural network model;
identifying structure information of a vector register, wherein the structure information includes a number of registers included in the vector register;
comparing a number of elements in the compressed data of the neural network model with a first condition, wherein the first condition is determined based on the number of registers in the vector register;
in response to the number of elements satisfying the first condition, associating the compressed data of the neural network model with the vector register to enable loading the compressed data of the neural network model to the vector register;
in response to the number of elements satisfying the first condition, sending an indication to end compression of the data;
comparing the number of elements in the compressed data of the neural network model with a second condition, wherein the second condition is determined based on the number of registers in the vector register, and is different from the first condition; and
adjusting a structure of the vector register in response to the number of elements satisfying the second condition,
wherein satisfying the first condition comprises being equal to or smaller than the number of registers in the vector register, and wherein satisfying the second condition comprises being equal to or smaller than one half of the number of registers in the vector register.

2. The method of claim 1, wherein compressing the data of the neural network model comprises pruning of the data.

3. The method of claim 1, wherein the data is a weight matrix of the neural network model.

4. The method of claim 1, wherein adjusting the structure of the vector register comprises:
reducing the number of registers in the vector register by one half.

5. The method of claim 1, wherein compressing the data of the neural network model comprises a first operation of compression, the method further comprising:
performing a second operation of compression of the data in response to the number of elements not satisfying the first condition.

6. The method of claim 1, further comprising:
generating an instruction set based on the association between the compressed data and the vector register to load the compressed data to the vector register.

7. The method of claim 1, wherein the vector register is part of a group of vector registers that include elements that are executed simultaneously.

8. An apparatus for reducing a size of a neural network model, comprising:
a memory storing a set of instructions; and
one or more processors configured to execute the set of instruction to cause the apparatus to perform:
compressing data of the neural network model,
identifying structure information of a vector register, wherein the structure information includes a number of registers included in the vector register,
comparing a number of elements in the compressed data of the neural network model with a first condition, wherein the first condition is determined based on the number of registers in the vector register,
in response to the number of elements satisfying the first condition, associating the compressed data of the neural network model with the vector register to enable loading the compressed data of the neural network model to the vector register,
in response to the number of elements satisfying the first condition, sending an indication to end compression of the data,
comparing the number of elements in the compressed data of the neural network model with a second condition, wherein the second condition is determined based on the number of registers in the vector register, and is different from the first condition; and
adjusting a structure of the vector register in response to the number of elements satisfying the second condition, wherein satisfying the first condition comprises being equal to or smaller than the number of registers in the vector register, and wherein satisfying the second condition comprises being equal to or smaller than one half of the number of registers in the vector register.

9. A non-transitory computer readable medium that stores a set of instructions that is executable by at least one processor of a computer to cause the computer to perform a method for reducing a size of a neural network model, the method comprising:

compressing data of the neural network model;

identifying structure information of a vector register, wherein the structure information includes a number of registers included in the vector register;

comparing a number of elements in the compressed data of the neural network model with a first condition, wherein the first condition is determined based on the number of registers in the vector register;

in response to the number of elements satisfying the first condition, associating the compressed data of the neural network model with the vector register to enable loading the compressed data of the neural network model to the vector register;

in response to the number of elements satisfying the first condition, sending an indication to end compression of the data;

comparing the number of elements in the compressed data of the neural network model with a second condition, wherein the second condition is determined based on the number of registers in the vector register, and is different from the first condition; and adjusting a structure of the vector register in response to the number of elements satisfying the second condition, wherein satisfying the first condition comprises being equal to or smaller than the number of registers in the vector register, and wherein satisfying the second condition comprises being equal to or smaller than one half of the number of registers in the vector register.

10. The non-transitory computer readable medium of claim 9, wherein compressing the data of the neural network model comprises pruning of the data.

11. The non-transitory computer readable medium of claim 9, wherein the data is the weight matrix of a neural network model.

12. The non-transitory computer readable medium of claim 9, wherein adjusting the structure of the vector register comprises:

reducing the number of registers in the vector register by one half.

13. The non-transitory computer readable medium of claim 9, wherein compressing the data of the neural network model comprises a first operation of compression, the method further comprising:

performing a second operation of compression of the data in response to the number of elements not satisfying the first condition.

14. The non-transitory computer readable medium of claim 9, wherein the set of instructions that are executable by the at least one processor of a computer to cause the computer to further perform:

generating an instruction set based on the association between the compressed data and the vector register to load the compressed data to the vector register.

\* \* \* \* \*